Oct. 7, 1941.  V. E. CLARK  2,258,134
AIRCRAFT WING STRUCTURE
Filed Aug. 10, 1938  3 Sheets-Sheet 1
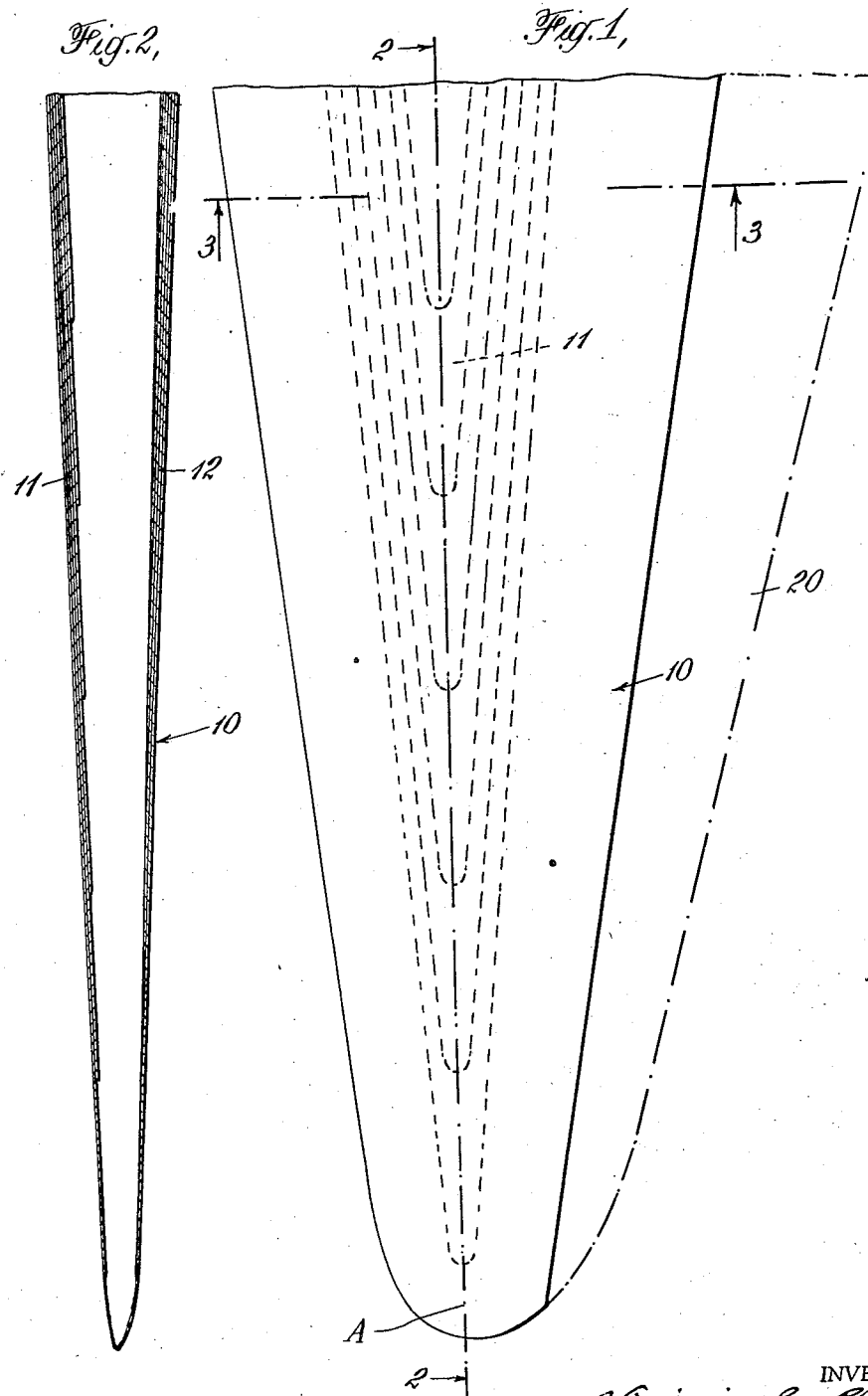
INVENTOR.
Virginius E. Clark
BY
Hoguet, Neave & Campbell
ATTORNEYS Oct. 7, 1941.    V. E. CLARK    2,258,134
AIRCRAFT WING STRUCTURE
Filed Aug. 10, 1938    3 Sheets-Sheet 2
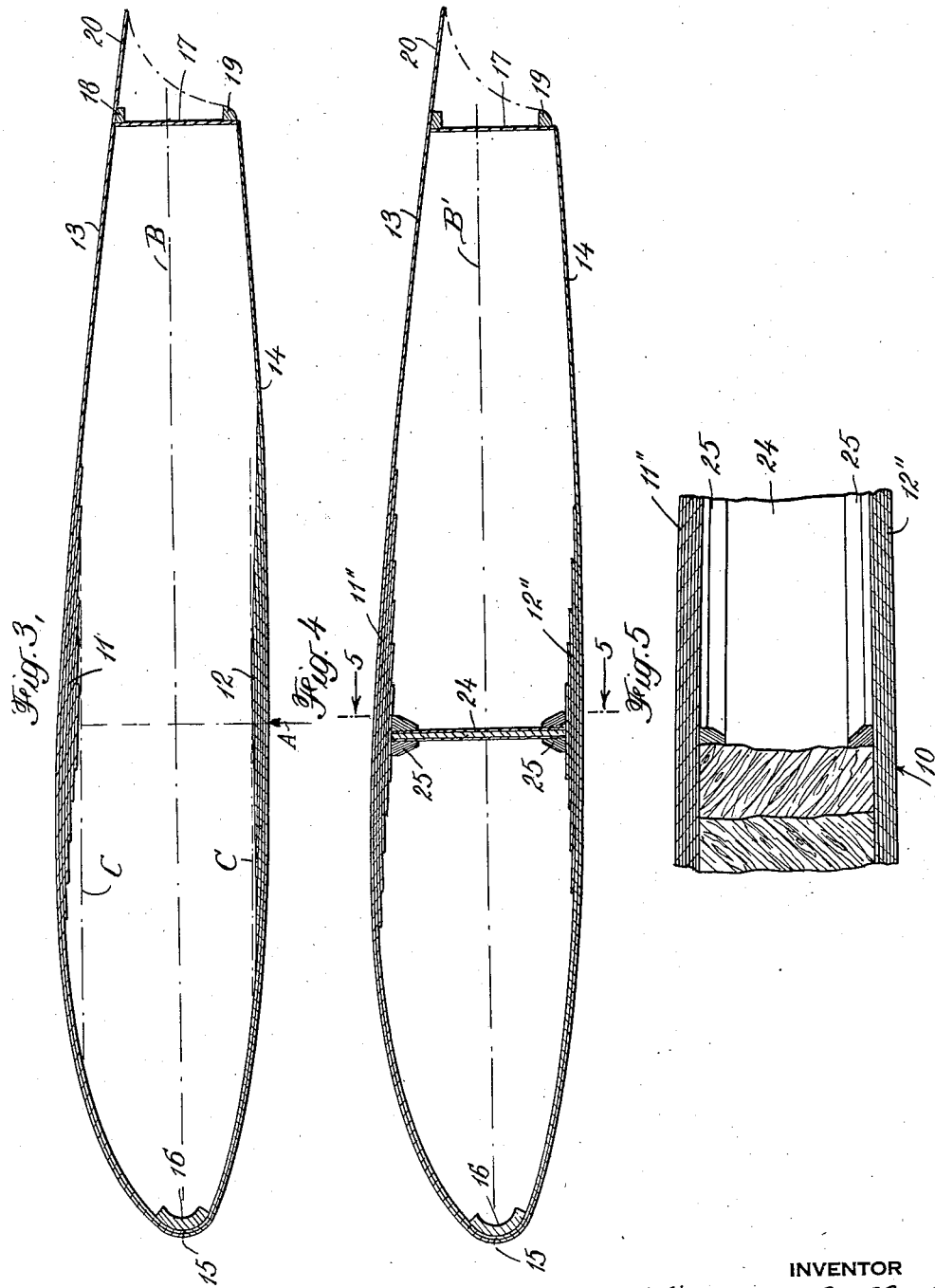
INVENTOR
Virginius E. Clark
BY
ATTORNEYS Oct. 7, 1941.  V. E. CLARK  2,258,134
AIRCRAFT WING STRUCTURE
Filed Aug. 10, 1938  3 Sheets-Sheet 3
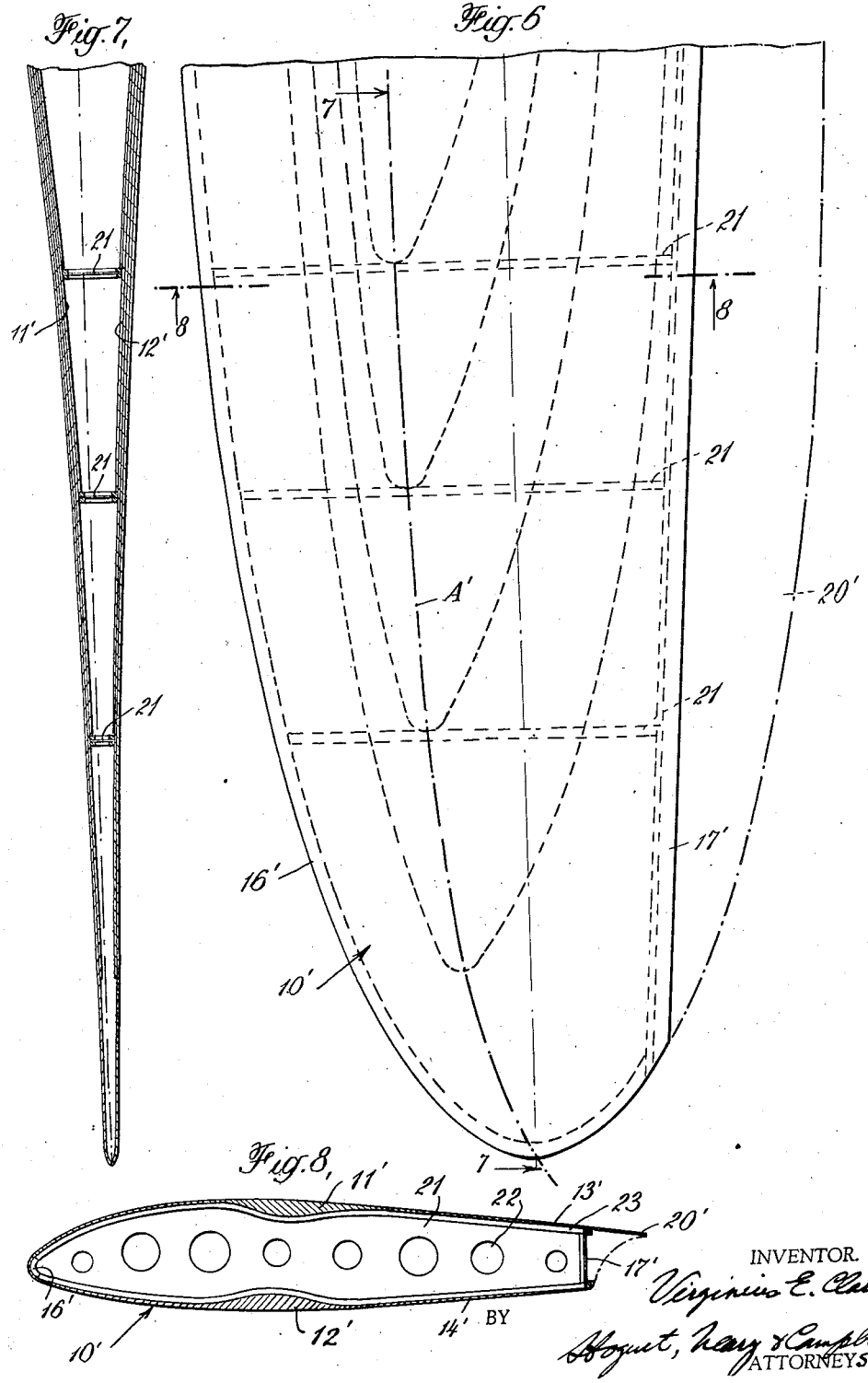
INVENTOR.
Virginius E. Clark
BY
ATTORNEYS Patented Oct. 7, 1941

2,258,134

UNITED STATES PATENT OFFICE 2,258,134

AIRCRAFT WING STRUCTURE

Virginius E. Clark, Hagerstown, Md., assignor, by mesne assignments, to John F. Neary, Jr., Englewood, N. J., as trustee Application August 10, 1938, Serial No. 224,093

10 Claims. (Cl. 244—123)

This invention relates to aircraft structure, and has particular reference to a novel structure for an aeroplane wing, elevator, rudder, aileron, wing flap, and like parts.

It is a well recognized fact that an aeroplane wing having a given area, span and taper will provide definite advantages if the mean or average thickness ratio of the airfoil section is kept to a minimum. Among these advantages are reduction in profile drag with resultant increase in speed, and other improvements in general performance characteristics for a given weight and power of the aeroplane.

In accordance with the present invention, an aeroplane wing, elevator, rudder, aileron, wing flap, or like part, is so constructed and arranged as to impart proper and safe structural strength and rigidity thereto without undue increase in the airfoil thickness ratio in the case of a wing, as well as to provide a novel structure and construction for such aeroplane parts.

A preferred embodiment of the invention as applied to an aeroplane wing, for example, comprises a shell structure formed in airfoil cross-section of suitable material so as to provide the maximum value of strength and rigidity with a minimum of weight, and this is accomplished by disposing the material around the airfoil contour of the shell so that the portions above and below and most remote from the neutral aerodynamic axis of the airfoil section, which are subjected to the greatest stress under normal bending load in flight, are thicker than the remaining portions of the shell section. These thickened portions of the wing accordingly extend longitudinally of the upper and lower surfaces of the wing shell, and are preferably formed by progressively overlapping layers of the shell material extending outwardly from the fuselage or butt end of the wing or the like.

The material of which the wing is formed is of considerable importance, for the reason that the aforementioned major stress-sustaining portions of the wing should be made as thick as is necessary to insure stability and strength under even abnormal loads. This construction lends itself admirably to the use of plywood as the material of which the shell is made, this material having the advantage of low specific density compared to the other common materials for aircraft construction, whereby the aforementioned major stress-sustaining portions of the shell may be made as thick as circumstances require without undue increase in weight. When made of plywood, the shell is preferably formed in two longitudinal upper and lower half-shells connected and arranged in a novel way.

It will be seen that the new aircraft wing structure affords many advantages over those heretofore employed, and is simple, light, inexpensive, and susceptible of large scale production with uniformity. The invention is illustrated in certain embodiments by the accompanying drawings, in which:

Figure 1 is a plan view of a triangular aeroplane wing constructed in accordance with the invention;

Fig. 2 is a longitudinal section therethrough, as seen along the line 2—2 of Fig. 1;

Fig. 3 is a transverse section through the wing as seen along the line 3—3 of Fig. 1;

Fig. 4 is a similar transverse section through a wing embodying a longitudinal shear web;

Fig. 5 is a section longitudinally of the wing of Fig. 4 as seen along the line 5—5 thereof, and illustrates the diagonal arrangement of the grain of the plies constituting the shear web;

Fig. 6 is a plan view of an elliptical wing constructed in accordance with the invention;

Fig. 7 is a longitudinal section therethrough, as seen along the line 7—7 of Fig. 6; and Fig. 8 is a transverse section therethrough as seen along the line 8—8 of Fig. 7, illustrating a form of chordwise bulkhead employable in the wing.

Referring to Fig. 1 of the drawings, numeral 10 designates a straight tapering or triangular wing in plan, which has the longitudinal contour illustrated in Fig. 2 and the airfoil cross-section illustrated in Fig. 3. For actual flight operating conditions and for the actual form and shape of the wing 10, the angle of attack thereof is selected slightly lower in value than the angle of attack which gives, and corresponds to, the maximum lift coefficient of the particular airfoil. For the condition of this particular angle of attack and corresponding lift coefficient, the direction of the vector, designated A in Fig. 3, representing the resultant aerodynamic force, is determined. The neutral axis B of the wing 10 is perpendicular to the vector A.

In accordance with this invention, the mass of the material of which the wing 10 is made is disposed around the airfoil contour thereof in the form of a shell in such a way as to provide the maximum value of section modulus for the shell. This is accomplished by massing the material generally along the plane of the vector A passing longitudinally of the wing, so that the portions thereof above and below and most remote from the neutral axis B are thickened, as is illustrated at 11 and 12, respectively, in Fig. 3. Although usually low and wide, these longitudinal thickened portions 11 and 12 thus become, in effect, interior longitudinal ribs or ridges and, since they lie in the plane of the force vector A, they constitute the major stress-sustaining members during the bending load applied to the wing in flight, upper rib 11 being in compression and lower ridge 12 being in tension. This condition is, of course, reversed when the aircraft is grounded. By reason of these ribs 11 and 12, the necessity of the usual stiffeners, auxiliary pieces attached interiorly of the wing to stabilize it against buckling, such as spars, stringers, and the like, is eliminated or minimized, enabling the wing in most cases to be of full monocoque construction as illustrated in Figs. 2 and 3.

Although any suitable material may be employed to form the wing 10, nevertheless, in order to provide larger stress-sustaining ribs 11 and 12 of any thickness requisite to sustain even abnormal loads without unduly increasing the weight of the wing, it is desirable to employ a material having a low specific density, such as on the order of less than fifty pounds per cubic foot. Thus by employing suitable low density material, enabling the use of comparatively thick ribs 12 and 13, the wing may be made self-stabilizing under high compressive loads, in that the material will not fail by buckling until or after the full compressive strength of the actual material has been developed.

As heretofore stated, plywood lends itself admirably to the structure of the wing described, having substantial strength per unit of volume and yet being so light in weight that ribs 11 and 12 can be practically any thickness that loading conditions require, as well as having the advantage of moldability into any practical shape, depending upon the shaping or forming process employed. Thus, the wing 10 may be formed of upper and lower longitudinal half-shells 13 and 14, respectively, of three plies of wood suitably secured together while conformed to the desired shape according to the process disclosed in copending application Serial No. 187,864, filed January 31, 1938, by O. H. Basquin, for example, although any other suitable process may be employed.

The thin wood plies forming the shells 13 and 14 are preferably so arranged that the grain of the two outer plies extends generally longitudinally of the wing 10, and the grain of the inner plies transversely thereto. Of course, a greater or less number of plies may be employed, depending upon requirements.

These half-shells 13 and 14 are secured together at their edges 15 along the leading edge of the wing by suitable means, such as a wood bar 16, to which the half-shells are attached as by a weather-proof adhesive, or other mechanical means, the exact position of the joint 15 on the contour of the composite wing shell 13, 14 being largely determined by the draft requirements of the moulds in or on which the half-shells are formed.

The half-shells 13 and 14 are preferably secured together along the rear or trailing edge of the wing 10 by means of a false spar 17 suitably secured to the half-shells 13 and 14 by wooden blocks or bars 18 and 19, respectively. The false spar 17 may be of truss or other suitable construction, or of plywood with lightening holes and the like. Where the wing 10 is constructed of full monocoque form, the false spar 17 and the leading edge of the wing, including bar 16, jointly carry shear. The ailerons and other parts along the rear or trailing edge of the wing 10, indicated in dot and dash outline at 20 in Fig. 1, may be mounted wholly or partly on the false spar 17, as will be readily understood.

The major load-sustaining ribs 11 and 12 are preferably formed by superimposed layers of plywood overlapping progressively from the fuselage or butt end of the wing outwardly toward the tip as illustrated in Figs. 1 and 2. The layers are of decreasing width so that a low and wide pyramidal structure in section is formed, which merges into the corresponding part of the shell 13, 14 as indicated in Fig. 3. The center lines of the several layers forming each of the ribs 11 and 12 preferably lie approximately in the plane of the vector A, as indicated in Figs. 1 and 3, or outside of lines drawn substantially parallel to the neutral axis B, as indicated in Fig. 3. The layers forming the ribs 11 and 12 may be single or multiple ply, suitably bonded to the shell 13, 14 and to each other, and are preferably scarfed at their edges so that a smooth, rounded surface for each rib is provided, as is indicated for the lower rib 12 in Figs. 2 and 3.

It will be observed in Figs. 1 and 2 that the ribs 11 and 12 taper or decrease in thickness outwardly from the butt end of the wing 10, in accordance with the strength requirements thereof, and that the composite wing shell 13, 14 is of uniform thickness at all points except at the rib 11 and 12, whereby the aforementioned desirable feature of lightness without sacrifice in strength, but on the contrary, increased strength are obtained, while maintaining a minimum average thickness ratio of the airfoil sections. It will be understood that the invention may be applied to the construction of elevators, rudders, ailerons, wing flaps, and like parts, the structural details being, of course, conformed to the requirements of such parts.

As is illustrated in Fig. 6, the wing 10' may be made elliptical in plan, as well as triangular, semi-elliptical and the like, and, in fact, any desirable shape. In this form, the major load sustaining ribs, indicated at 11' and 12' in Figs. 7 and 8, again lie along the line of the aerodynamic force vector, which line A' is curved in this instance. The elliptical wing of Fig. 6 has the advantage of the inherent strength and rigidity of a compound curved structure, i. e. curved in two transverse directions, although the leading edge of the triangular wing of Fig. 1 may also be curved to secure these advantages without materially changing the aerodynamic characteristics of a triangular wing.

Also, as is indicated by Fig. 7, with the construction of this invention the shape of the wing in longitudinal section may be conformed to the ideal shape, i. e. the familiar bending moment curve of a cantilever beam. The moldability of plywood again lends itself admirably to the conformation of the wing to this section.

For large wings 10 or 10', a semi-monocoque construction may be employed in which chordwise bulkheads are utilized to maintain the true airfoil contour and to stabilize the wing shell against local loads and rigidity in torsion. Such bulkheads are illustrated in Figs. 6, 7 and 8, as being spaced lengthwise of the wing 10', being preferably positioned at each flap and aileron hinge so as to evenly distribute the concentrated loads, arising from the control surfaces, into the wing shell 13', 14'. The aileron and flap contour in plan is generally indicated at 20' by the dot and dash line, it being understood that this outline is merely schematic, the particular shape of the ailerons and flaps in plan being immaterial insofar as the present invention is concerned. The bulkheads 21 may be plywood webs with lightening holes 22, as shown in Fig. 8, solid webs, truss structures, simple rings shaped like strip 23, or any other arrangement which will serve the purpose described. They are rigidly secured by suitable means, such as strips 23, bonded to the inner surfaces of the shells 13' and 14', including the smoothed ribs 11', 12', the leading edge bar 16' and the false spar 17'.

Where a vertical shear web is desired to be used, the web 24 is placed approximately perpendicular to the neutral axis B', as shown in Fig. 4. The position of the shear web 24 transversely of the wing is approximately at the point where the thickness of the airfoil section is maximum, which is usually between 30 and 34% of the true airfoil chord length. The shear web 24 may be formed of plywood, the grain of the two outer layers, if there are three as illustrated, preferably running at an angle of 45° to the vertical, and the grain of the center ply running at right angles thereto, i. e. at 45° to the vertical in the opposite direction, so as to provide maximum strength in horizontal shear for the minimum weight of web. Wooden blocks 25 or strips are bonded along the upper and lower edges of the shear web 24 and the flanged edges thus formed are bonded to the smoothed surfaces of the upper and lower major load-sustaining ribs 11" and 12", as illustrated in Figs. 4 and 5. Where a vertical shear web like 24 or its equivalent is used, the chordwise bulkheads 21 of Figs. 6, 7 and 8 are not employed.

The wings constructed in accordance with this invention may be secured to the fuselage, hull, superstructure, or other fixed part of the aeroplane by suitable fastening means connected to the butt end, as for example, the fastening or mounting means disclosed in copending application Serial No. 233,934 filed, October 8, 1938, by G. A. Allward. Likewise, ailerons, flaps, elevators, rudders, etc., may be attached in any suitable way.

It will be seen that the structure for aeroplane wings, ailerons, elevators, rudders, flaps, and other aeroplane parts, provided by this invention, affords many advantages over those heretofore employed, among which are reduction in the profile drag resulting in higher speed and general improvement in the performance characteristics of the aeroplane, improved strength and rigidity without increase in weight or airfoil thickness ratio, elimination of longitudinal spars and minimization or elimination of stabilizing stiffeners.

The structure enables the use of plywood whereby the parts may be conformed to any desired shape with low weight and with an aerodynamically smooth surface, thereby reducing air skin friction losses and thus further increasing the aeroplane speed, and saving time, material and construction costs, as well as providing other obvious advantages.

By using plywood or its equivalent, the wing half-shells may be in one piece, although if desired the wings may be assembled of panels of half-wing lengths or panels with separate wing tips secured thereto and the like. Likewise the ailerons, rudders, elevators, wing flaps, and the like, may be made of one-piece plywood half-shells secured together along their leading and trailing longitudinal edges, in the manner described, or they may be assembled of panels, as described. The shear webs, and chordwise bulkheads, while preferably made of plywood, may be metallic solid webs, perforated webs, trusses, rings and the like.

Although certain preferred embodiments of the invention have been illustrated and described herein, it is to be understood that the invention is not limited thereby, but is susceptible of changes in form and detail within the scope of the appended claims.

I claim:

1. A structure for aeroplane wings and the like, comprising a shell of airfoil contour of substantially uniform wall thickness, and thickened portions, on the upper and lower inner surfaces of said shell, said thickened portions being formed integrally with the shell and tapering longitudinally toward the tip of the wing and being positioned substantially in a plane normal to the neutral aerodynamic axis of the airfoil section of the wing and passing through the deepest part of the wing, as viewed in transverse section.

2. A structure for aeroplane wings and the like, comprising a shell of airfoil contour, at least a portion of said shell being thickened to form a rib integral therewith, said thickened portion tapering longitudinally of the shell from the butt toward the tip thereof.

3. A structure for aeroplane wings and the like, comprising a shell of airfoil contour having a thickened portion projecting inwardly from the inner surface thereof tapering inwardly from the wing surface as seen in transverse cross-section of the wing, and tapering longitudinally of the wing from the butt toward the tip thereof.

4. A structure for aeroplane wings and the like, comprising a shell of airfoil contour having a thickened portion projecting inwardly from the upper inner surface thereof tapering inwardly from the wing surface as seen in transverse cross-section of the wing, and tapering longitudinally of the wing from the butt toward the tip thereof.

5. A structure for aeroplane wings and the like, comprising a shell of airfoil contour having thickened portions on the upper and lower inner surfaces thereof tapering inwardly from the wing surfaces as seen in transverse cross-section of the wing, and tapering longitudinally of the wing from the butt toward the tip thereof.

6. A structure for aeroplane wings and the like, comprising a shell of airfoil contour, at least a portion of said shell being thickened, said thickened portion tapering longitudinally of the wing from the butt toward the tip of the wing, and consisting of a plurality of layers of substantially rigid material of lesser transverse and longitudinal dimensions than the wing, the taper of said thickened portion being afforded by a progressive decrease in the number of said layers from the butt toward the tip of the wing.

7. A structure for aeroplane wings and the like, comprising a shell of airfoil contour, and a plurality of layers of substantially rigid material forming a portion of and projecting inwardly from the inner surface of said shell, said layers progressively decreasing in width transversely of the shell and progressively decreasing in length longitudinally from the tip to the butt end of the shell.

8. A structure for aeroplane wings and the like, comprising a shell of airfoil contour having a plurality of layers of substantially rigid material secured to the upper and lower inner surfaces and forming a portion of said shell, the said layers progressively decreasing in width transversely of the shell and progressively decreasing in length longitudinally from the tip to the butt end of the shell.

9. A structure for an aeroplane wing and the like, comprising a plywood shell of airfoil contour having plywood ribs formed of a plurality of plies extending longitudinally of the upper and lower inner surfaces thereof, said ribs being spaced apart and lying substantially in a longitudinal plane extending normal to the neutral aerodynamic axis of the airfoil section of the wing, and a shear web connecting said ribs and extending longitudinally of said wing and substantially parallel to said plane.

10. A structure for an aeroplane wing and the like, comprising a plywood shell, the grain of the adjacent plies thereof extending in transverse directions, and a plurality of plies of progressively increasing length from butt to tip secured on the inner surface of said shell forming a longitudinal rib extending from the butt toward the tip of the wing and spaced from the leading and trailing edges thereof, said rib being positioned at a point most remote from the neutral aerodynamic axis of the airfoil section of the wing.

VIRGINIUS E. CLARK.